May 6, 1952
E. W. BAILY
2,595,913
FILTER
Filed May 24, 1947
2 SHEETS—SHEET 1
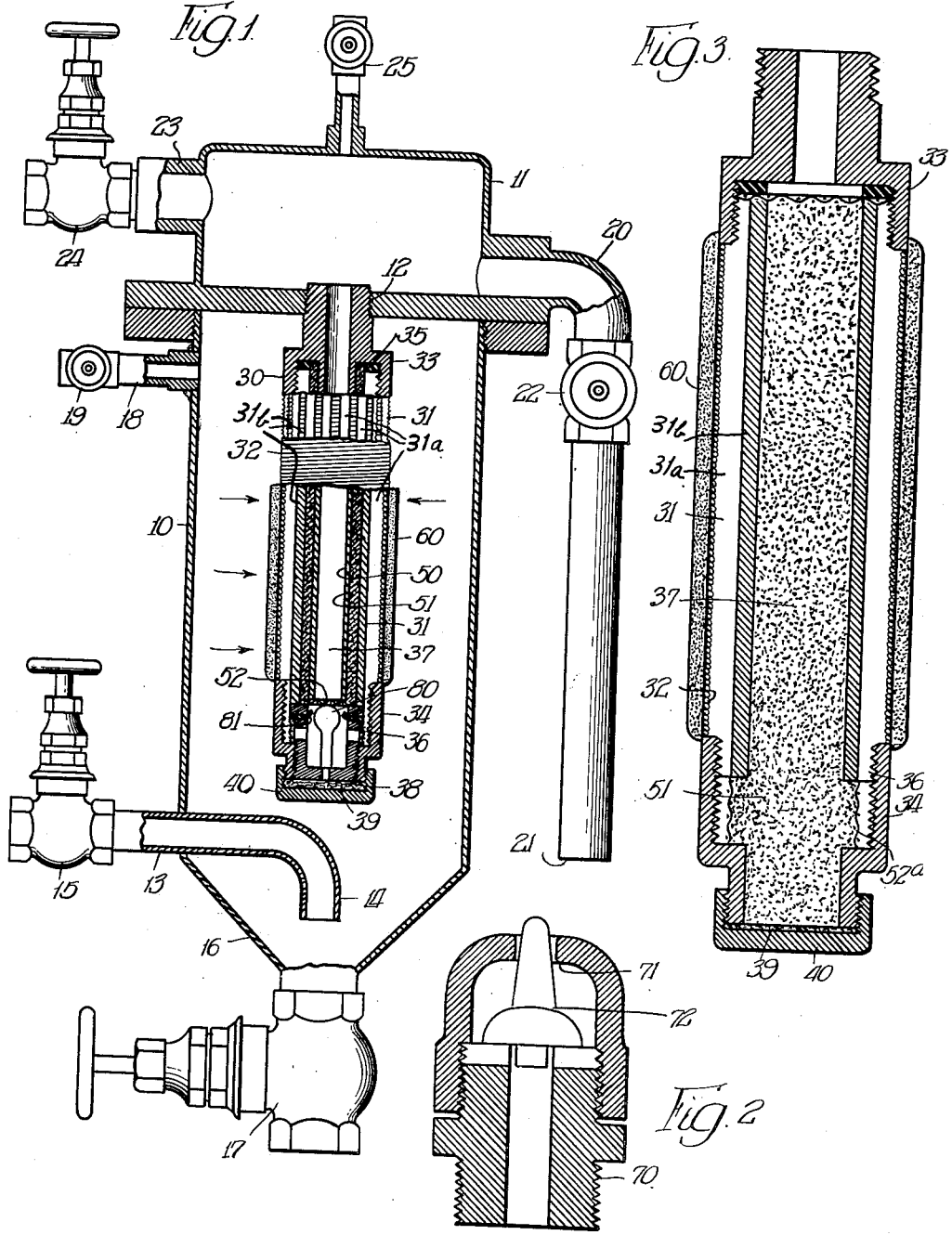
INVENTOR.
EDGAR WILLIAM BAILY
BY Patented May 6, 1952

2,595,913

UNITED STATES PATENT OFFICE 2,595,913

FILTER

Edgar W. Baily, Purley, England, assignor to Paterson Engineering Company, Ltd., London, England, a corporation of Great Britain Application May 24, 1947, Serial No. 750,242
In Great Britain July 8, 1946

Section 1, Public Law 690, August 8, 1946
Patent expires July 8, 1966

3 Claims. (Cl. 210—183)

This invention relates to filters of the kind in which the filtering medium consists of silicious earth, kieselguhr, or other fine particulate material deposited from suspension in the liquid to be filtered, or some other liquid, on to a porous or metallic support, such as for example, that shown in the patent to Paterson No. 2,347,927, such filters being primarily intended for relatively small water supplies or for filtering oil or other liquids.

A principal object of this invention is to provide an improved filter of the type referred to in the said Paterson patent.

Another object is to provide a filter of the type described, in which the bed of filter aid material will remain firmly attached to the bed during periods when the filter is not in operation.

A further object of this invention is to provide a filter element, and a filter assembly, which permits discontinuous filter flows without the necessity of reforming the bed of filter aid material at the beginning of each service run.

With such filters as hitherto constructed there is a tendency for the deposited bed to become loosened, and to partially or completely fall away from its support, when the flow of liquid through the filter ceases. On the resumption of flow the first filtrate is cloudy and must be diverted to waste, and in the patent above referred to there is described means for automatically diverting this first filtrate. Even where auxiliary supports, such as open mesh wire grids, are used to retain the bed in position, such loosening may occur and the bed may partially or completely fall away from the support.

The primary object of the present invention is to improve the construction of filters of the kind referred to so as to eliminate this tendency of the bed to loosen when the filter is out of operation, or at all events to reduce such tendency to a minimum, so that the amount of the first filtrate (if any) requiring to be discharged before the filtrate runs clear will be very much smaller than is required with existing filters.

I have found that the bed of filter aid material has less tendency to break away from the filter support if it is maintained in air than if maintained in a liquid medium. In fact, when the filter bed is supported in air, the filter can be subjected to rather severe shocks without loosening the bed from the support. In contrast, in the customary filter of this type, in which the filter casing or body is kept full of liquid, a slight jar is sufficient to cause the bed to fall away from the support. This difference in attraction of the bed to the support may be due, in any particular case, to one or more of several causes: slight, and even unmeasurable, back pressures which might cause a slight reverse flow through the filter bed; currents in the liquid surrounding the bed; and the like. Whatever the causes, it has been usual, in filters of this type, for the filter bed to fall away from the support when the flow through the filter was discontinued for a time. I have found that if the liquid in the filter body (at the termination of flow) is non-turbulently drained from the body or casing, preferably through the bed, as hereinafter described, the filter bed will remain on the support even if subjected to rather severe shock. This is a point of considerable economic value as this general type of filter is often used in installations in which it is desirable, or even necessary, to operate for short, disconnected periods. Obviously, it is wasteful of time and labor to have to re-establish the bed at the beginning of each short service run. It will be understood that it is sometimes necessary to remove the filter bed as it gradually compacts, and in this respect I do not depart from former practice. I am concerned primarily with retaining a bed, still satisfactory for filter service, on the filter support during periods of rest.

When considered as a process, my invention comprises non-turbulently draining the water from the filter casing and retaining the bed on its support in a medium of air. When considered as an apparatus, my invention comprises a filter of the kind referred to, in which the liquid, after passing through the filter bed, is directed towards the base of the filter element and then passes upwardly through an inner tube or conduit before reaching the outlet. There is also preferably included an automatic siphon which causes the liquid in the casing above the level of the bottom of the filter element to pass through the filter bed and out the effluent line. In my preferred form of apparatus there is no variation in the normal filtering procedure: the filter bed being either introduced as a suspension in liquid before filtration, or poured as a slurry into the filter body where it is agitated by the incoming liquid and the suspension formed in the filter body, or casing, itself. As the liquid passes through the filter element, or support, the filter aid material becomes strained out on the surface of the element, the liquid passing through the bed thus formed to the interior of the element and thence to the outlet.

The arrangement is such that on shutting off the main flow the liquid remaining in the filter can be forced through the filter element under air pressure or may be made to pass through by drawing or siphoning from the interior of the element, leaving the bed firm and intact on the support. When the flow is re-started after a period of stoppage there is very little, if any, disturbance of the bed and therefore only a very small quantity, if any, of the first filtrate needs to be diverted to waste—certainly a very much smaller quantity than with any other filter of the kind referred to of which I am aware.

Further features of the invention will be apparent from the description given hereafter.

The accompanying drawings illustrate two modes of carrying out the invention.

Figure 1 is a sectional elevation of one form of filter in accordance with the invention, part of the filter element being shown in profile and part in cross section.

Figure 2 is a section of an automatic air inlet valve suitable for use when the effluent conduit also comprises a siphon from the filter casing.

Figure 3 is a sectional elevation of an alternative form of filter element.

Figure 4:
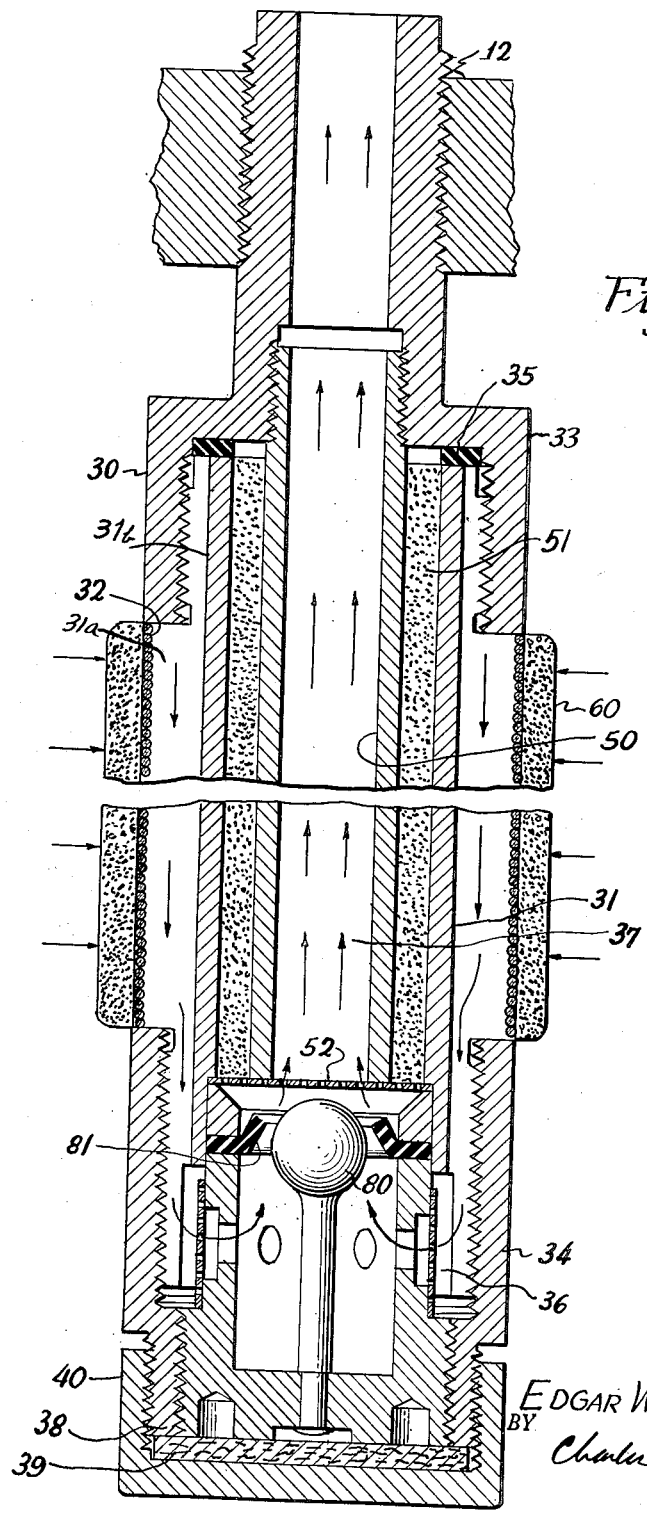
Figure 4 is an enlarged detail sectional view of the filter element shown in Figure 1.

In carrying my invention into effect in one convenient manner, the filter body 10 is surmounted by a filter head 11 which is threaded, as at 12, to receive the filter element 30 described hereafter. The inlet pipe 13 is preferably formed with a down-turned end 14 and is also provided with a control valve 15. The base 16 of the filter body 10 is preferably conical in shape, as shown, and is provided with a sludge, or drain valve 17. The filter body is also provided with an air inlet line 18, equipped with a suitable valve 19. The valve 19 can be hand-operated, as shown in Figure 1, if air pressure were being used, or alternatively this can be an automatic air valve (as shown in Figure 2) when a siphon is employed. An outlet pipe 20 leads from the filter head 11, and preferably will extend downwardly to a level 21 below the lower end of the element 30 in order to produce a siphon when the filter is filled with liquid. A valve 22 controls flow through the outlet pipe 20, as shown. Line 23, provided with valve 24, is used (when it is desired to remove the bed) to admit compressed air or air at atmospheric pressure, or as a connection for back-flushing liquid, as is customary with filters of this type. Valve 25, at the top of the filter head, is an air release valve provided to ensure removal of air which would interfere with the operation of the siphon.

The filter element, referred to generally as 30, as shown in Figure 1, and in enlarged detail in Figure 4, preferably comprises a fluted tubular support, or former, 31 on which is wound a wire 32 with small clearances between adjacent turns. The ends of the former 31 are provided with end caps 33 and 34. Associated with the upper end cap 33 is a washer 35 adapted to close the ends of the channels 31a between the flutes 31b in the former 31. The bottom end cap 34 and the adjoining part of the support are so arranged as to leave a passageway 36 communicating between the channels 31a and the bore 37 of the fluted former 31 through cross drilled passageways in an inner wall portion of said end cap 34. The channels 31a of the former 31 are in direct communication with said cross drilled passageways, the tube of the former being machined away on the inside. For constructional purposes the lower end of the end cap 34 is preferably threaded as shown at 38. A washer 39 and end cap 40 threaded into the lower end of end cap 34 provide a liquid tight bottom for the element 30. For certain purposes a tube 50 may be carried down continuously from the outlet opening in the top cap to the elevation of the upper end of the inner wall portion of end cap 34. The inside of tube 50 provides the passageway 37. If it is desired to introduce granular material 51, to maintain the chamber formed within the inner portion of the cap piece 34 sterile, such as in the form of silver coated sand or grit, for example, this would usually be introduced in the annular space between the tubes 31 and 50, respectively, the gauze 52 being provided to prevent it entering and constricting the fluted channels 31a. It should here be understood that there is no flow of liquid in the annular space between said tubes, and all that is necessary to maintain sterility in said lower chamber is that the silverized grit be in contact with liquid therein.

An alternative form of element without the tube 50 in the center is shown in Figure 3. This is of similar construction except that the omission of the tube 50 of Figures 1 and 4 leaves a larger space, i. e., the entire volume of bore 37, for any granular material which it may be desired to put in the element. In this form a screen, or metal gauze 52a keeps the material from blocking the passageway 36.

In operation, for example, with the filtration of dirty water, the liquid enters through the inlet 13 and is discharged downwardly at 14. By entering the filter body 10 at the conical bottom 16 the liquid stirs up the filter bed material previously introduced, carries this in suspension and deposits it as a coating 60 on the filter element. The liquid passes through the coating, or bed, 60, and the element 30 in the direction of the arrows and all of it passes first downwardly in the channels between the flutes to the lower part of the filter element, and then up through the inner tube 50 and out through the filter head 11 and siphon pipe 20. If the flow to the filter is stopped, and valve 19 opened immediately, the water will continue to siphon out of the filter until it falls in the filter body to the level of the upper end of the cap 34. If it is desired to hasten the discharge, as for example, when dealing with more viscous liquids, air pressure would be applied through valve 19 instead of merely opening it to atmosphere. The operation in this case is the same except for the speed of discharge and also under pressure the element itself can be almost completely emptied of liquid so that it is possible, if required, to remove the filter head without disturbing the bed on the element.

When it is desired to remove the bed, as is necessary from time to time, immediately on stopping the flow of liquid through the filter, valve 24 is opened, which breaks the siphon, and waste valve 17 is also opened. This permits the small quantity of liquid in the filter head to flow in the reverse direction through the element, throwing off the bed in the manner normal with this type of filter. When necessary, a supply of compressed air, or other fluid under pressure, can be admitted through valve 24 to the interior of the filter, to implement the throwing off process.

If the filter is arranged to work with a siphon only, an automatic valve as illustrated in Figure 2 would be fitted in place of valve 19. This may comprise an adaptor 70 with a valve seat 71 and a valve 72 made of rubber or other light material. This valve would be mounted vertically on the filter body, which allows the body to fill up with liquid until the liquid reaches the valve, whereupon the valve 72 is lifted against the seat 71 and is held in position by the liquid pressure. When the flow of liquid through the filter is stopped, owing to the presence of the siphon the pressure in the filter becomes slightly less than atmospheric, and the valve opens, automatically allowing air to enter the filter body so that the liquid can drain out through the filter element and the siphon pipe 20.

It is obvious that the filter assembly should be so arranged as to prevent breaking of the siphon before all of the water, or other liquid, is siphoned from the head 11 and casing 10 down to the lower end of the filter support. It will be obvious to those skilled in the art that many expedients can be used for maintaining the siphon unbroken, such as sealing the outlet 21 by immersing it in a body of liquid, and the like. These expedients are well known and need not be described in detail.

In the event the siphon should be broken a check valve may be provided to prevent backflow through the filter bed. One of the best of these is shown in Figure 1. The check valve preferably is located at the lower part of the inner tube or conduit to prevent inadvertent reversal of flow of the contents of the tube but permits complete siphoning of liquid down to the lower end of the filter bed. The simple form shown comprises an upstanding valve stem, the upper end of which is spherical in shape and forms a valve body 80, in the lower part of the bore 37, and above the passageway 36. Associated with the valve body 80 is a flexible valve ring or seat 81. The valve ring should be sufficiently stiff to withstand back-pressure resulting from the head of liquid in the bore when the siphon is broken, thus preventing such liquid from flowing backwards through the filter bed. The ring should be sufficiently flexible to permit normal filtering or backwash flows to distort it away from the valve body 80. Such a valve prevents flows through the filter elements in either direction except under pressure in excess of that due to the head of liquid in the bore 37. Thus the valve operates to prevent the small amount of liquid in the bore from draining through the filter bed but does not interfere with normal filtering or backwash flows.

A filter constructed as above may of course have any number of elements instead of one only, as illustrated for simplicity.

Although I have described the invention in its application to a wirewound filter unit, it may be applied to filter units in which the kieselguhr or like filter bed is supported upon other forms of metallic support or a porous support. The manner in which I provide for diversion of the filtrate after passing through the filter bed to one end of the filter unit for reverse travel to the other end before passing to the outlet, may be suitably modified depending upon the type of filter unit to which the invention is applied or any practical requirements that may have to be fulfilled.

I claim:

1. A filter arranged for use with filter aid material and comprising a casing, a filter head on said casing, an inlet for liquid to be filtered into said casing, a filtered liquid outlet from said filter head, a filter element suspended from the filter head and interposed between said inlet for liquid to be filtered and said filtered liquid outlet, said element comprising a pervious outer filter bed support, an impervious open ended tube mounted within said support in spaced co-axial relationship thereto, a passageway connecting the space between said support and said tube with the interior of said tube at the lower end only of said tube, and an outlet from the upper end of the tube, a conduit leading from said filtered liquid outlet downwardly to an elevation below the lower end of said filter element, a normally closed gas inlet into said casing upstream of said filter element, and means for opening said gas inlet.

2. A filter according to claim 1 having also a valve in said passageway, said valve comprising a valve body rigidly mounted centrally in said passageway subjacent the base of said impervious tube and a resilient annular valve seat affixed to and extending inwardly from the wall of said passageway into contact with said valve body, said resilient valve seat being sufficiently stiff to permit upward and downward flexing of said seat away from said valve body only under pressure in excess of that due to the normal head of liquid in the inner tube during filtering.

3. A filter of the type described which comprises a filter casing, an inlet for liquid to be filtered into said casing, an outlet for filtered liquid from said casing, a vertically extending filter element interposed in said casing between said inlet and said outlet, said filter element having a pervious outer wall for supporting a filter bed of granular material, said filter being characterized by means for retaining the filter bed on said pervious wall upon termination of filtering, said means including a central tubular conduit in said element having an impervious wall, vertical channels between said pervious and impervious walls, means for closing the upper ends of said channels, passageways communicating the lower ends only of said channels and said central conduit, a conduit leading from said outlet to an elevation below the lower end of the filter element, a normally closed gas inlet into said casing upstream of said filter element, and means for opening said gas inlet.

EDGAR W. BAILY.

REFERENCES CITED

The following references are of record in the file of this patent:

UNITED STATES PATENTS

| Number | Name | Date |
|---|---|---|
| 539,800 | Durant | May 28, 1895 |
| 598,191 | Wilcox | Feb. 1, 1898 |
| 704,012 | Emerson | July 8, 1902 |
| 1,771,928 | Jung | July 29, 1930 |
| 1,992,101 | Stuart | Feb. 19, 1935 |
| 2,057,814 | Barrett | Oct. 20, 1936 |
| 2,103,572 | Wells | Dec. 28, 1937 |
| 2,281,053 | Seney et al. | Apr. 28, 1942 |
| 2,347,927 | Paterson | May 2, 1944 |

FOREIGN PATENTS

| Number | Country | Date |
|---|---|---|
| 18,404 | Great Britain | 1898 |
| 526,221 | Great Britain | Sept. 12, 1940 |
| 847,555 | France | July 3, 1934 |